United States Patent [19]

Steinle et al.

[11] Patent Number: 5,410,347

[45] Date of Patent: Apr. 25, 1995

[54] COLOR OPTICAL SCANNER WITH IMAGE REGISTRATION HOLDING ASSEMBLY

[75] Inventors: Michael J. Steinle; Steven G. Henry, both of Fort Collins; Dean Buck; Jerry L. Bybee, both of Loveland, all of Colo.

[73] Assignee: Hewlett-Packard Company, Palo Alto, Calif.

[21] Appl. No.: 108,409

[22] Filed: Aug. 18, 1993

Related U.S. Application Data

[63] Continuation-in-part of Ser. No. 932,166, Aug. 19, 1992, Pat. No. 5,339,107.

[51] Int. Cl.[6] .............................................. H04N 9/083
[52] U.S. Cl. .................................... 348/270; 348/266; 358/512
[58] Field of Search ........................... 348/270, 266; H04N 9/083; 358/512; 250/226

[56] References Cited

U.S. PATENT DOCUMENTS 2,880,267  3/1959  Goldmark et al. .
4,709,144  11/1987  Vincent ........................ 250/226
4,855,818  8/1989  Morimoto et al. ................ 358/512

FOREIGN PATENT DOCUMENTS 1-147956  6/1989  Japan ...................... H04N 1/04
2-277374  11/1990  Japan ...................... H04N 1/06
4-81068  3/1992  Japan ...................... H04N 1/04

OTHER PUBLICATIONS

Office Action mailed Sep. 24, 1993 re German application No. P 43 20 059.1-31 of Hewlett-Packard Co.

Primary Examiner—James J. Groody
Assistant Examiner—Cheryl Cohen

[57] ABSTRACT

A scanning apparatus having a linear photosensor, an imaging assembly, and a scanning displacement assembly adapted for producing relatively constant rate linear displacement between an imaged object and the imaging assembly to cause scan line portions of the object to be sequentially imaged on the linear photosensor device and an image registration holding assembly associated with the scanning displacement device to cause an image from each different scan line portion on the object to be temporarily held in registration with the linear photosensor.

22 Claims, 14 Drawing Sheets

COLOR OPTICAL SCANNER WITH IMAGE REGISTRATION HOLDING ASSEMBLY

This Application is a Continuation-In-Part of U.S. Patent application Ser. No. 07/932,166 filed Aug. 19, 1992, now U.S. Pat. No. 5,339,102 for COLOR OPTICAL SCANNER of Henry et al., which is hereby incorporated by reference for all that it discloses.

BACKGROUND OF THE INVENTION

The present invention relates generally to color optical scanners and, more particularly, to a single pass color optical scanner which employs a single linear sensor array.

Color optical scanners are similar to black and white optical scanners in that data representative of a scanned document (object) is produced by projecting an image of the scanned document onto optical sensors. The optical sensors produce data signals representative of the intensity of the light impinged thereon. These data signals are typically digitized and stored in appropriate data storage media. Such stored data may later be used, as for example through a personal computer and computer monitor, to produce a display image of the scanned object.

The image of the scanned object is projected onto the optical photosensor array incrementally by use of a moving scan line. The moving scan line is produced either by moving the document with respect to the scanner optical assembly or by moving the scanner optical assembly relative to the document.

Color optical scanners differ from black and white scanners in that multiple color component images of an object must be collected and stored to produce a color display image of the object. Typically, data representative of red, green and blue component color images of the scanned object are produced and correlated for storage.

Various techniques are used in color optical scanners for collecting data representative of multiple component color images. One technique is to project imaging light onto a single linear sensor array during multiple scanning passes using differently colored illumination sources. For example, a document is first scanned using only red light, then only green light and finally, only blue light. In a variation of this technique, three scanning passes are made using a white light illumination source but the imaging light is filtered before it enters the sensor array with a different color filter during each of the three passes. Such a technique is described in U.S. Pat. No. 5,122,911 of Kuo which is hereby specifically incorporated by reference for all that it describes.

Another technique, such as described in Vincent, U.S. Pat. No. 4,709,144 and Boyd et al., U.S. Pat. No. 4,926,041, which are both hereby specifically incorporated by reference for all that is disclosed therein, is to split a polychromatic scan line light beam into multiple color component beams which are projected onto multiple linear photosensor arrays. For example, an imaging beam from the same narrow scan line region of a document is split into red, green and blue component beams which are then simultaneously projected onto separate linear photosensor arrays. Using this technique, the component color image data generated from any particular scan line is generated simultaneously and is thus easily stored in a correlated form.

Yet another technique for generating multiple color component images from a polychromatic light beam is to simultaneously project light from different scan line regions of a document onto separate linear photosensor arrays such as described in Takeuchi, R. et al. (1986) "Color Image Scanner with an RGB Linear Image Sensor", SPSE Conference, The Third International Congress On Advances in Non-Impact Printing Technologies, pp. 339–346, August 1986, which is hereby specifically incorporated by reference for all that it discloses. Using this technique it is necessary to perform data manipulation to correlate the data representative of different scan line component images since the different component color images of any scan line region of the document are generated at different times.

Various types of photosensor devices may be used in optical scanners. Currently the most commonly used photosensor device for optical scanners is the charge coupled photosensor device or "CCD". A CCD builds up an electrical charge in response to exposure to light. The size of the electrical charge built up is dependent on the intensity and the duration of the light exposure. In optical scanners CCD cells are aligned in linear arrays. Each cell or "pixel" has a portion of a scan line image impinged thereon as the scan line sweeps across the scanned object. The charge built up in each of the pixels is measured and discharged at regular "sampling intervals". In most modern optical scanners the sampling intervals of the CCD arrays are fixed. A typical CCD sampling interval is 4.5 milliseconds.

As previously mentioned, an image of a scan line portion of a document is projected onto the scanner's linear sensor array by scanner optics. The scanner optics comprise an imaging lens which typically reduces the size of the projected image from the original size of the document considerably. Pixels in a scanner linear photosensor array are aligned in a "cross" direction, i.e., a direction parallel to the longitudinal axis of the scan line image which is projected thereon. The direction perpendicular to the "cross" direction will be referred to herein as the "scan" direction. Each pixel has a "length" measured in the cross direction and a "width" measured in the scan direction. In most CCD arrays the length and width of the pixels are equal, e.g. 8 microns in each dimension. The "line width" of a linear CCD array is the same as the width of each of the individual pixels in the array.

At any instant when an object is being scanned, each pixel in the CCD array has a corresponding area on the object which is being imaged thereon. This corresponding area on the scanned object is referred to herein as an "object pixel" or simply "pixel." An area on a scanned object corresponding in area to the entire area of the linear sensor array is referred to herein as an "object scan line" or simply "scan line." An object scan line has the dimensions of the linear sensor array divided by the magnification ratio of the imaging lens. For descriptive purposes a scanned object is considered to have a series of fixed adjacently positioned scan lines.

Scanners are typically operated at a scan line sweep rate such that one scan line width is traversed during each CCD sampling interval.

SUMMARY OF THE INVENTION

The present invention is directed to a scanning apparatus for generating a data signal representative of an object, typically a page of text or other document, which is scanned.

The scanning apparatus includes a linear photosensor which generates a data signal representative of the intensity and duration of light which is impinged thereon during each of a series of photosensor operating or "sampling" intervals. An imaging assembly images the object onto an image plane where the linear photosensor array is located.

A displacement assembly causes relative displacement between the imaging assembly and the object to continuously change the portion of the object which is in alignment with the imaging assembly during a single scanning cycle or sweep of the scanning apparatus.

Ordinarily the relative movement between object and imaging assembly would cause the portion of the object which is imaged onto the linear photosensor array to continuously change during a scanning sweep. However in the present invention an image registration holding assembly is provided which causes the image from each scan line portion of the object to be held in fixed registration with the linear photosensor array during a series of holding cycles occurring during the scanning sweep. These holding cycles are timed relative to the operating interval of the photosensor array such that a scan line is "frozen" on the array during each operating interval. This "freezing" of each scan line causes the data signal generated by the photosensor to more accurately represent the object which is imaged than with prior art devices since the data generated during each operating interval is representative of information from only a single scan line portion of the object rather than an averaging of information from two or more adjacent scan lines.

The image registration assembly may take various forms. Rotating or oscillating mirrors or lenses which intersect the imaging beam extending between the object and the image plane may be used to steer the imaging beam to maintain registration between each scan line portion of the object and the linear photosensor array during each photosensor array operating interval. In another image registration assembly embodiment the linear photosensor array is moved and reset during each photosensor operating interval to maintain registration between each scan line and the linear photosensor array.

Various other features may be incorporated into the image registration holding assembly. For example in one embodiment the image registration holding assembly incorporates color filters to cause red, green, and blue light images of each scan line to be sequentially imaged on the image plane during a single holding cycle which lasts for three photosensor operating intervals so as to generate a data signal representative of a color image of the object.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
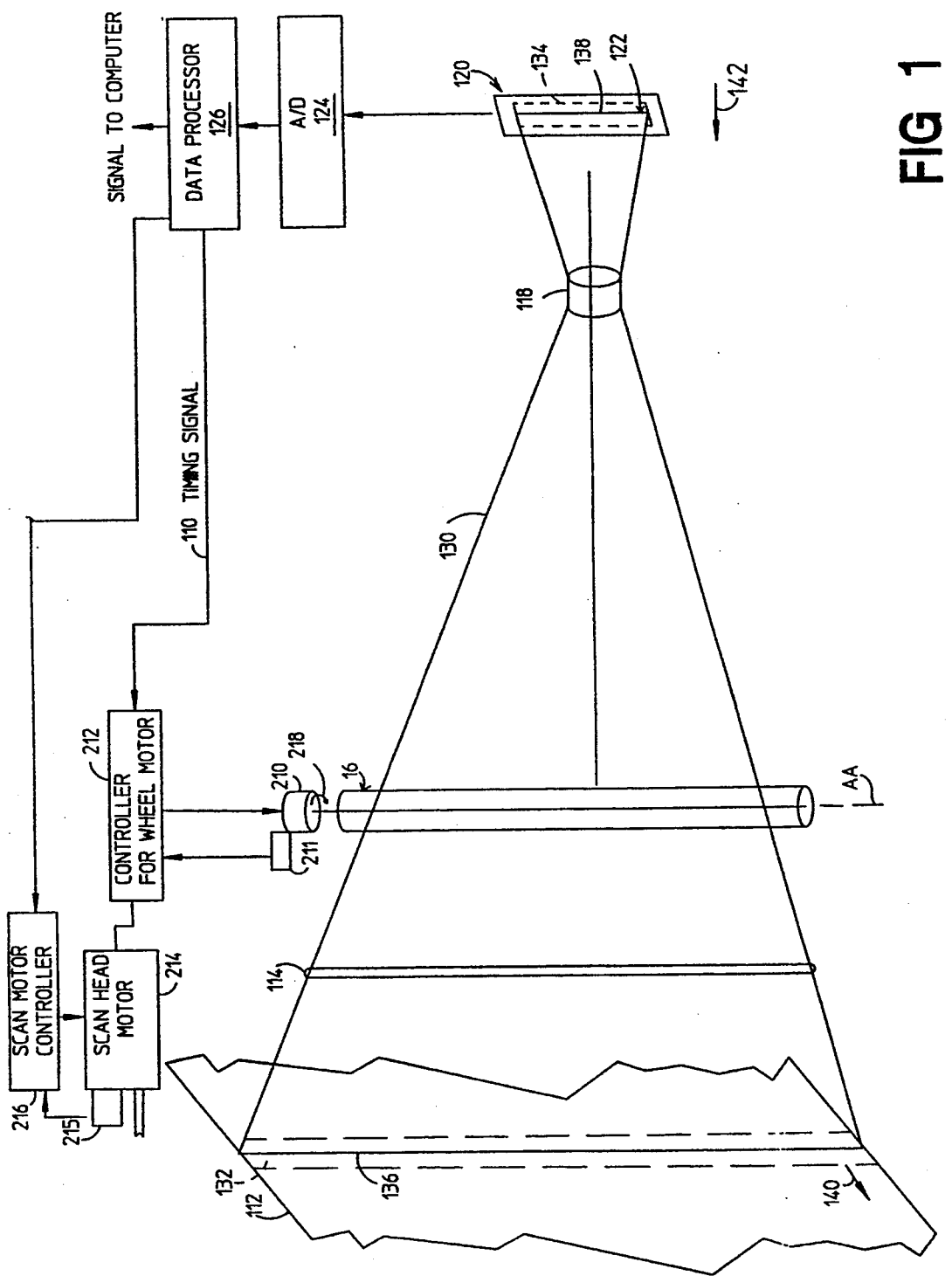
FIG. 1 is a schematic perspective view of a color scanner assembly.
Figure 7:
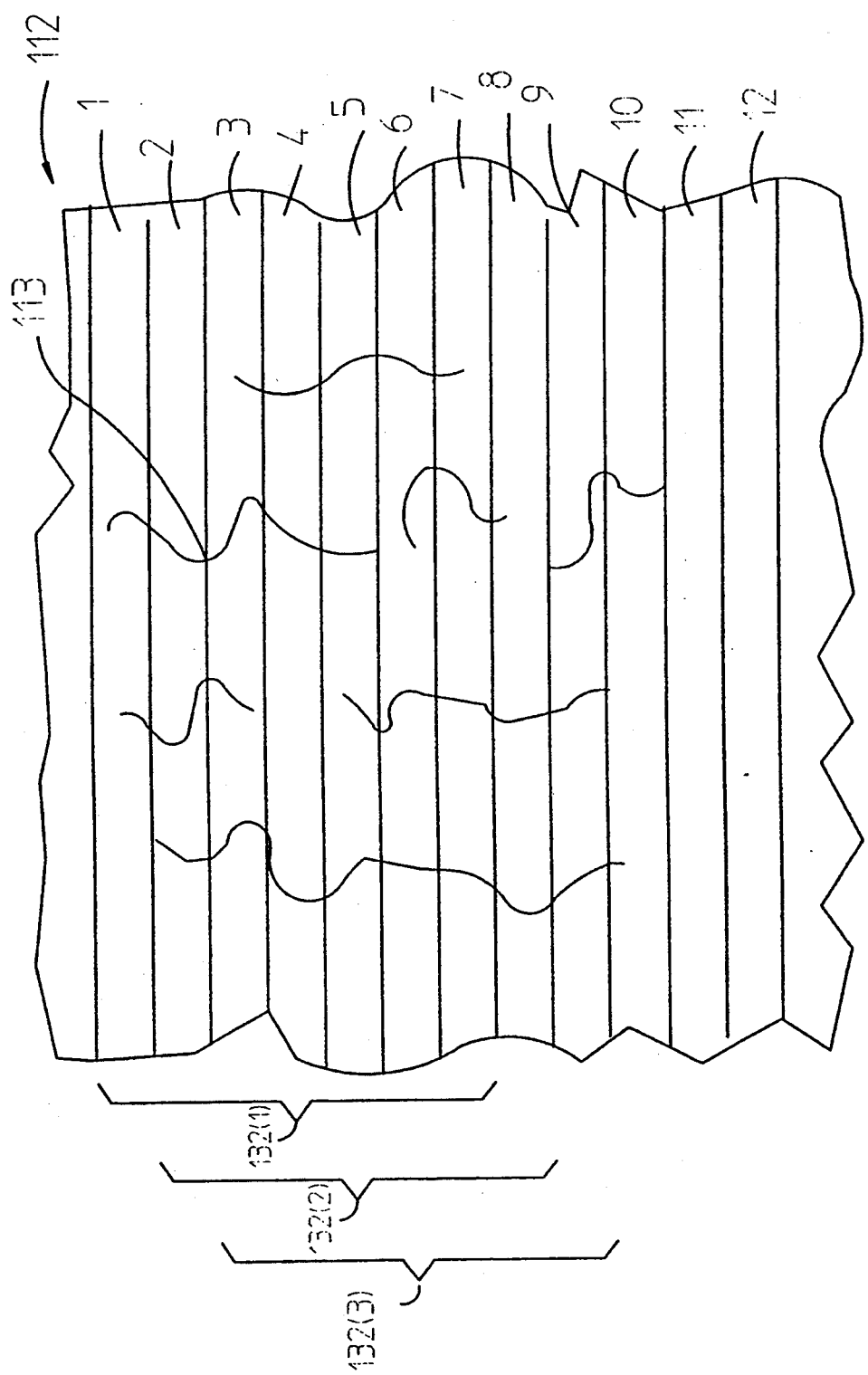
FIG. 7 is a plan view of a scanned object showing scan line portions thereof.

FIG. 1 schematically illustrates the major functional components of a color optical scanner 110. A scan object 112 such as a sheet of paper having graphics 113 thereon, FIG. 7, is supported on a transparent plate (not shown) for scanning by scanner 110. The scanner 110 comprises a light slit 114, a color wheel 116, an imaging lens assembly 118, and a linear photosensor unit comprising a single linear photosensor array 122.

The photosensor unit generates a data signal representative of the intensity of light impinged on the linear photosensor array 122 at regular sampling intervals. The analog data signal from the linear photosensor unit is digitized by an A to D converter 124 and transmitted to a data processor 126 which transmits the signal in a predetermined conventional format to a computer for subsequent storage and/or use in producing a visual display as is well known in the art.

Figure 4:
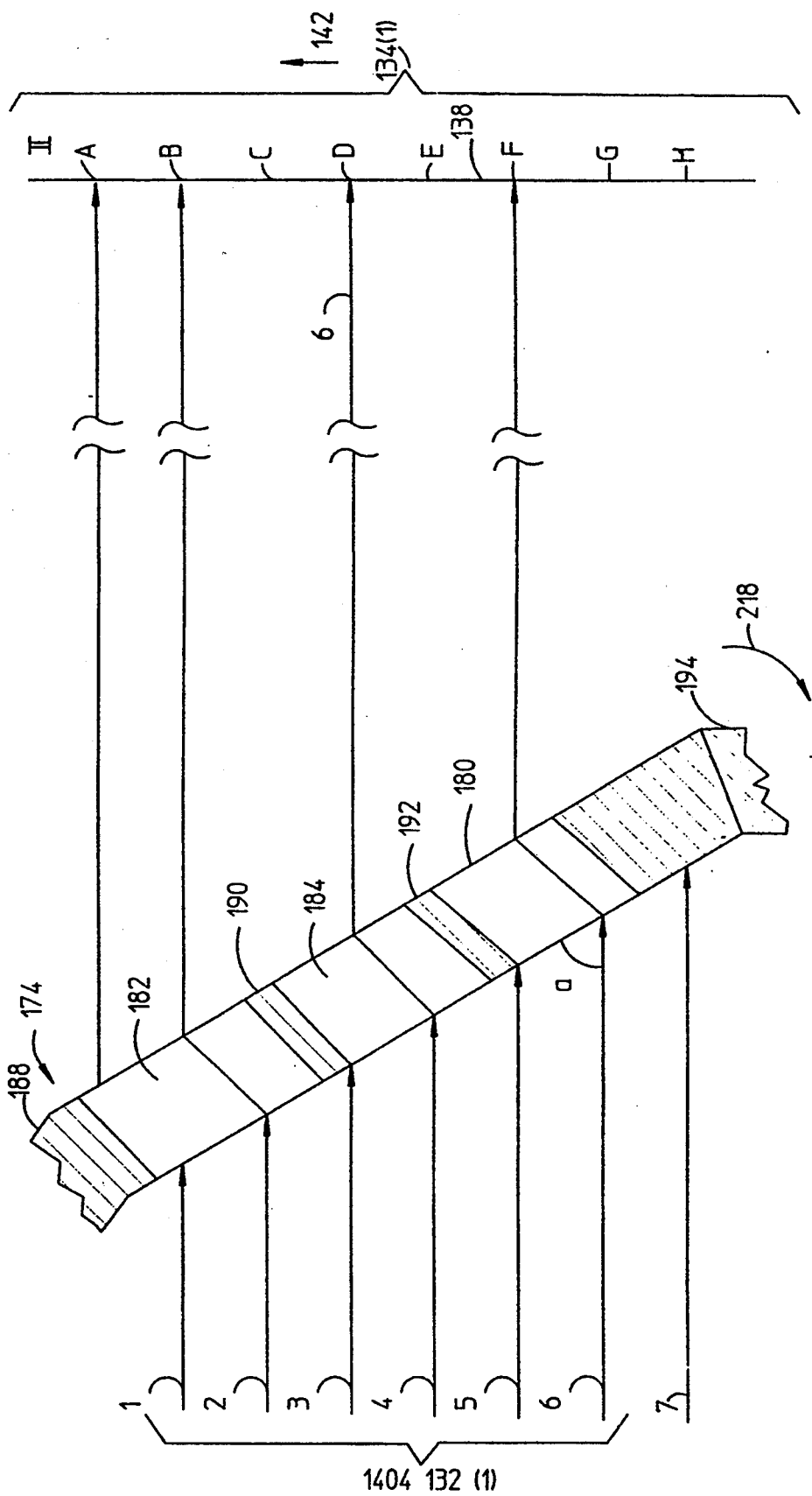
FIGS. 4, 5 and 6 are detail cross-sectional views showing relatively rotated positions of the color wheel face plate portion shown in FIG. 3 and illustrating a shift in the scan area image produced by such rotation.
Figure 5:
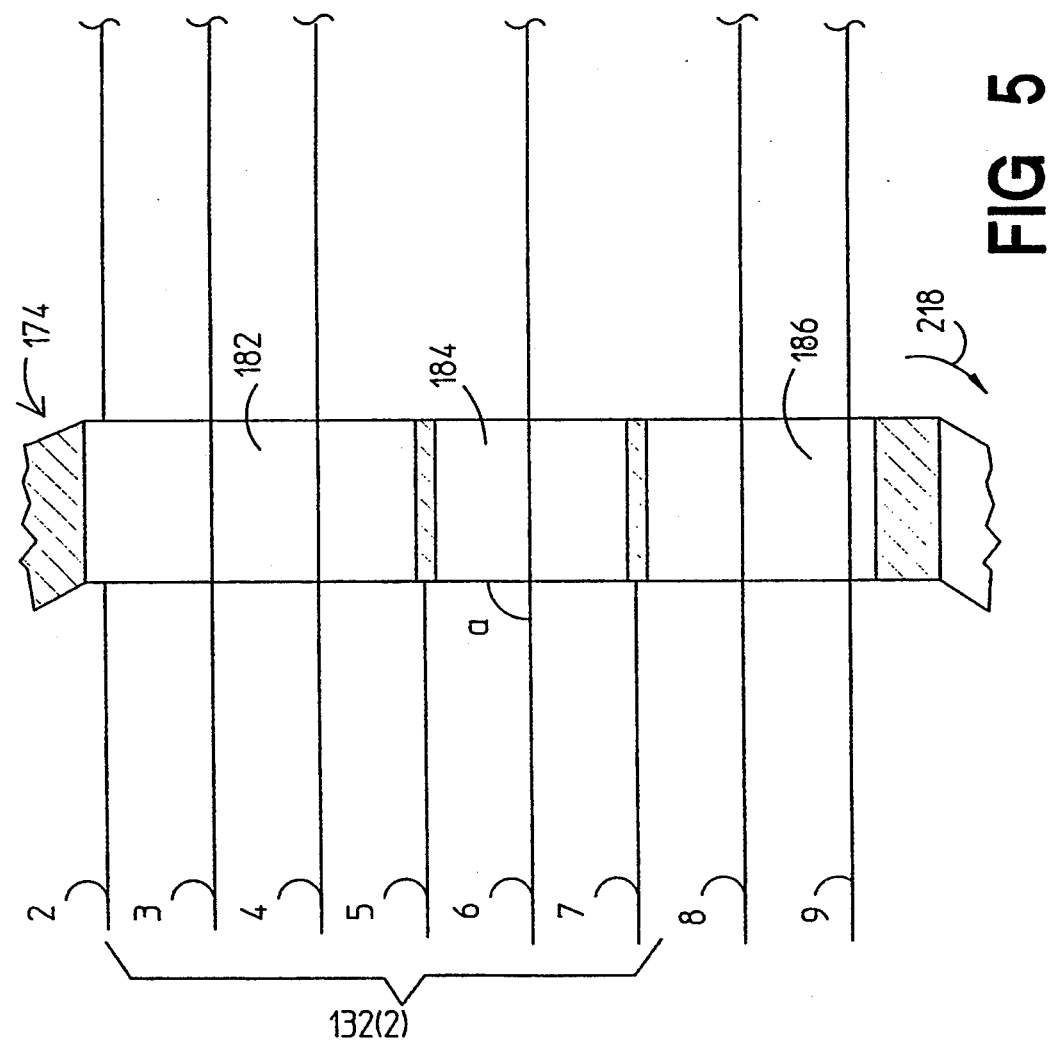
Figure 6:
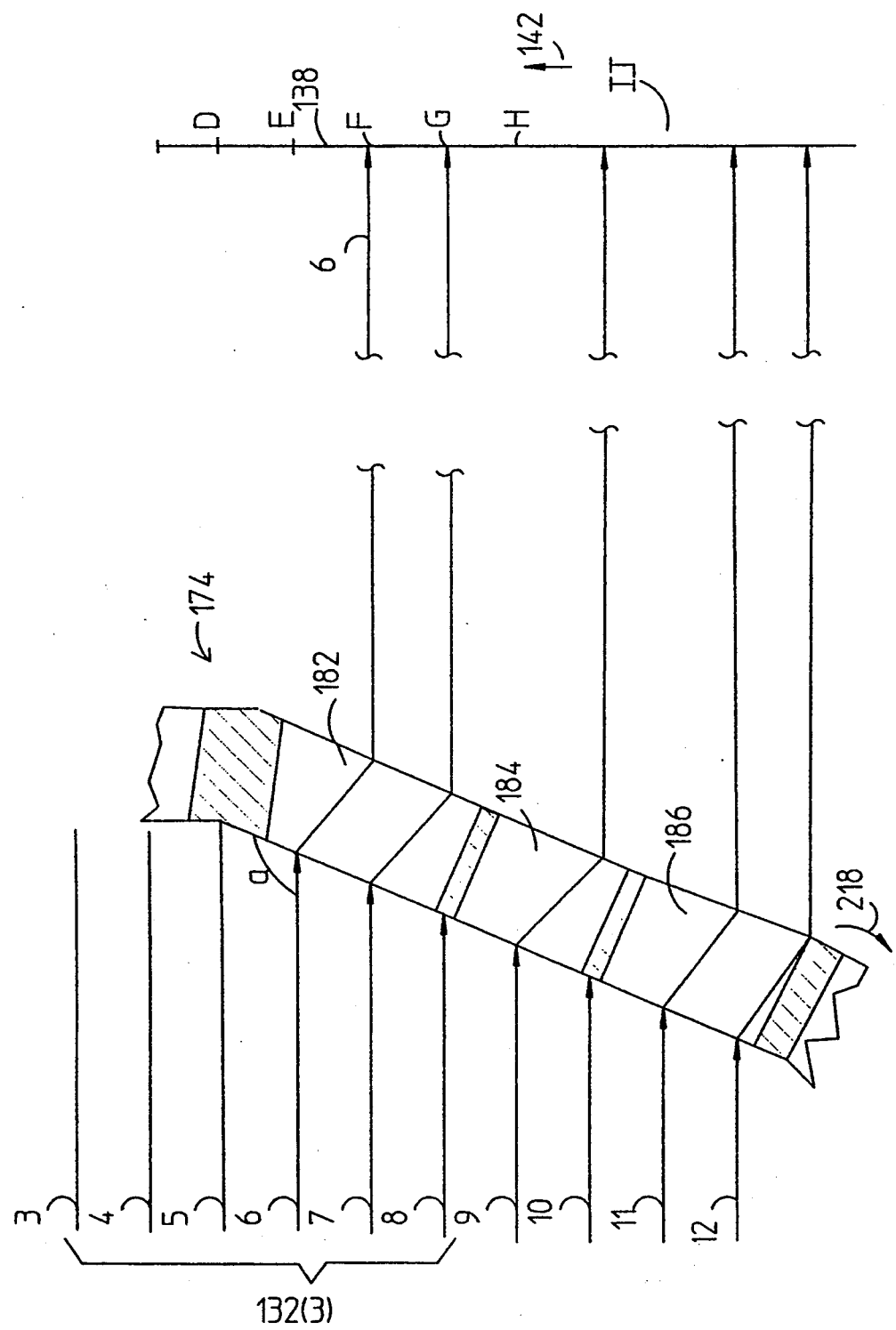

An imaging light path 130 (only the center plane of the light path is shown) extends from the scan area 132, through scan area defining slit 114 and imaging lens assembly 118 to an image plane II, FIGS. 4–6, corresponding to the face of linear photosensor unit 120. An image 134 of the scan area 132 is projected onto the image plane. The scan area 132 has a plurality of scan line portions 136 (only one scan line portion is shown in FIG. 1). Each scan line portion on the document has a width corresponding to the width of the linear photosensor array divided by the magnification ratio of the lens assembly 118. In the illustration of FIG. 1 an image 138 of scan line 136 is projected onto the image plane in registration with linear photosensor array 122. Thus linear photosensor array 122 during its current sampling interval would produce a data signal representative of scan line 136. The scan area 132 moves across document 112 in a scan direction 140 producing a corresponding movement of imaged scan lines in direction 142 on the image plane.

Figure 2:
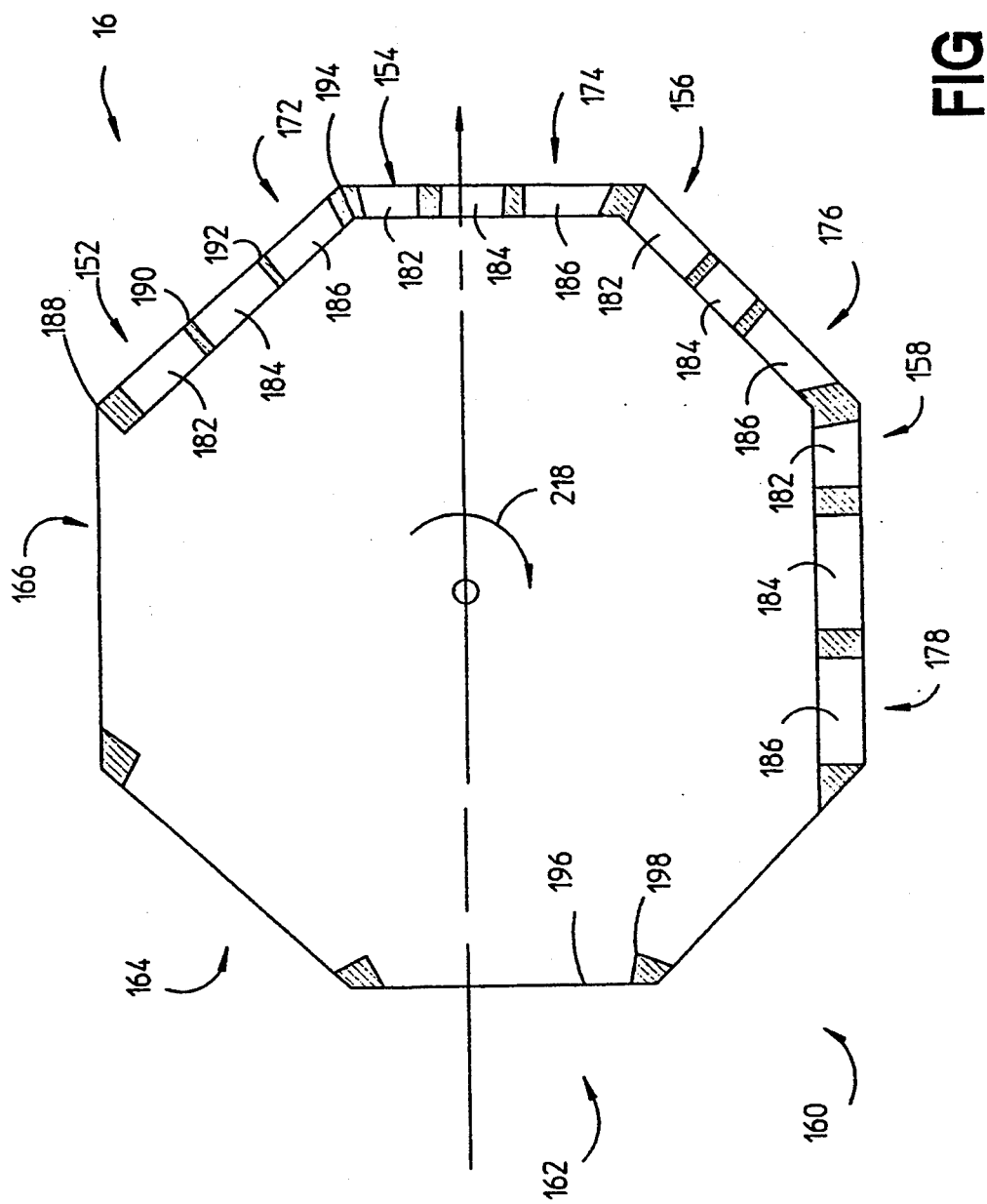
FIG. 2 is a cross-sectional side elevation view of a color wheel.
Figure 3:
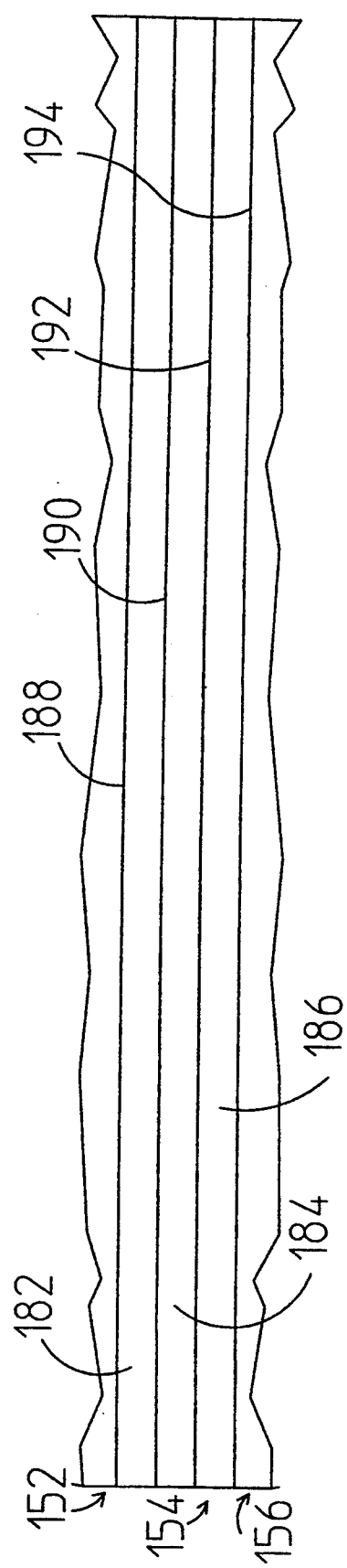
FIG. 3 is a detail elevation view of a face plate portion of color wheel 2.

A color wheel 152 with an axis of rotation AA extending transversely of the light path 130 has a generally polygonal cross-sectional configuration as illustrated in FIG. 2. The color wheel comprises a plurality of axially and circumferentially extending faces 152, 154, 156, 158, 160, 162, 164, 166. Filter plates 172, 174, 176, 178 are positioned at the faces 152, 154, 156, 158 on one diametric half of the color wheel. Each filter plate comprises a red filter portion 182, a green filter portion 184, and a blue filter portion 186 which extend axially the full length of the color wheel as best shown in FIG. 3. The red, green and blue filter portions transmit only red, green and blue light respectively. The filter portions on each plate are circumferentially separated from one another and from filter portions on adjacent plates by small opaque portions 188, 190, 192, 194 as best shown in FIGS. 3–6.

Faces 160, 162, 164, 166 on a second diametric half of the color wheel are open faces which allow unobstructed passage of light therethrough. However, peripheral structural members 196, etc. and counterweights 198 are provided so as to produce equal peripheral weighting of the color wheel to ensure smooth rotation.

As shown by FIG. 1, a color wheel motor 210 is provided with an absolute encoder 211 which produces a data signal representative of the relative rotated position of the color wheel at any particular point in time. This data signal is provided to a color wheel controller 212. The controller 212 also receives a timing signal from the photosensor data processor 126 which is representative of the occurrence of sampling intervals of the photosensor unit. The controller 212 sends a control signal to the color wheel motor 210 causing it to rotate at a predetermined speed in properly phased relationship with respect to the sampling operation of the linear photosensor array as discussed in greater detail below.

A scan head motor 214 having an absolute encoder 215 is used to produce relative motion of a scan line displacement assembly. The scan head motor is controlled by a scan motor controller 216 which may receive a data signal from photosensor data processor 126 indicative of the photosensor sampling frequency. The scan motor is controlled by the motor controller 216 to operate at a rate directly proportional to the photosensor sampling frequency. In one preferred embodiment of the invention, the scan head motor is operated so as to produce relative displacement between the scan object 112 and the scanner optics of one scan line per photosensor sampling interval. Various structures for producing relative motion between a scan object and scanner optics to sweep a scan area across an object are known in the art including apparatus for moving a document relative to stationary scanner optics, apparatus for moving scanner optics relative to a stationary document, and apparatus for displacing mirrors for reflecting imaging light from a stationary object into a stationary imaging assembly. It is to be understood that any of the known methods for producing relative displacement of a scan area across a document may be employed with the present invention. The conventional method of moving a pair of mirrors relative to a stationary document and a stationary imaging assembly is presently the best mode contemplated for performing this function in association with the color wheel of the present invention. In view of the fact that scan area displacement assemblies are well known in the art, particular structure for achieving this result will not be further described herein.

The color wheel rotates about an axis AA disposed transversely with respect to light path 130 in a rotation direction 218. Prior to a scanning sweep the color wheel is accelerated up to a predetermined rotation rate which in one preferred embodiment is the speed necessary to displace an arcuate portion of the wheel containing one color filter plate, e.g. 172, during three photosensor sampling intervals. Thus in the illustrated embodiment in which there are three color filter regions 182, 184, 186 on each plate and in which the plates are arranged in an octagonal configuration, the rotation rate would be one rotation per 24 sampling intervals. The rotation of the wheel is also phased with respect to the operation of the photosensor array such that light which is imaged on the linear photosensor array passes through one and only one color filter portion during each sampling interval. Thus, for example, only blue light will be impinged on the linear photosensor during a first sampling interval, only green light during the following sampling interval, and only red light during the next following sampling interval, then, again, only blue light during the next sampling interval, and so on.

As is well-known in the optical arts, the relative lateral displacement "d" of the path of a light beam produced when a light beam strikes a plate having a thickness "x" and an index of refraction "N" at an angle "a" may be expressed by the equation $d=x[\tan(a)-\tan[\sin^{-1}(\sin(a)/N)]]/\cos(a)$. Thus imaging light, upon striking a filter plate, e.g. 154, will be relatively displaced on the image plane in the scan direction whenever the angle of incidence "a" is different than 90 degrees. The maximum amount of displacement which occurs may be selected by choosing the number of sides in the polygonal structure of the wheel (and thus the maximum and minimum angle of incidence) and by selecting plate thickness and coefficient of refraction. FIG. 4 illustrates that, during initial rotation of a plate, e.g. 174, into intersecting relationship with the imaging light beam, the image on the image plane II will be relatively shifted in image plane scan direction 142. The maximum amount of image shifting will occur at the beginning and at the end of the period of time that a particular plate, e.g. 174, intersects light path 130 with no shifting occurring at the point when the plate 174 is aligned perpendicular with the light path.

FIG. 4 illustrates a position of the color wheel at which plate 174 has intersected light from a scan area 132 which currently includes scan lines 1–6 shown in FIG. 7. The lines 1–6 indicated in FIG. 4 represent the centerline of the imaging light cone projected from scan lines 1–6 shown in FIG. 7. As may be seen from FIG. 4, but for the fact of light refraction produced by plate 174, scan lines, 1, 2, 3, 4, 5, 6 would be aligned with fixed lines B, C, D, E, F, G respectively, on image plane II. However, due to the refraction, the imaging light is shifted up one scan line width on the image plane such that scan lines 1, 2, 3, 4, 5, 6 are aligned with image plane lines A, B, C, D, E, F. Scan line 6 in FIG. 4 is, through this refractory displacement, positioned in registration with the linear photosensor array 138 positioned at fixed image plane line F. At the position of movement illustrated in FIG. 4 scan line 6 passes only through blue filter region 186 and thus the linear photosensor array 138 has only blue light impinged thereon.

FIG. 5 illustrates the position of plate 174 after it has rotated from the position of FIG. 4 to an orientation perpendicular to the imaging light path. In the position illustrated in FIG. 5 plate 174 causes no refractory shift of the light from the scan lines. However, due to the movement of the scan area from 132(1) to 132(2), scan lines 2, 3, 4, 5, 6, 7 are now directly aligned with image plane lines B, C, D, E, F, G, H. Thus, light from scan line 6 remains in registration with the linear photosensor 138 located at position F on image plane II in spite of the relative movement of the object scan lines due to scan area movement. In FIG. 5 light from scan line 6 passes only through green filter region 184 and thus the photosensor 138 has only green light impinged thereon.

FIG. 6 shows the filter plate 174 at a further rotated position whereat incident light beams in the imaging light path strike plate 174 at an obtuse angle a. In FIG. 6 the scan area has again moved one scan line width such that light from scan line 7 would be impinged upon photosensor 138 if not for the refraction caused by the plate. As a result of the refraction caused by plate 174, the scan line image is shifted one scan line width downwardly, i.e., in the direction opposite 142, such that scan line 6 remains in registration with photosensor 138. It may also be seen from FIG. 6 that as a result of the movement of the scan area 132 to position 132(3) and the relative movement of plate 174 in rotation direction 218 that scan line 6 now passes through red filter area 182 such that only red imaging light is impinged on linear photosensor array 138.

It will be appreciated from the above description that as the color wheel 16 rotates a single scan line, e.g. 6, will be "frozen" in registration with the linear photosensor array 138 during the entire period when light passing through plate 174 is imaged on photosensor 138. This result is accomplished due to the fact that the shifting motion of the scan line image which would ordinarily be expected as a result of scan area displacement on the object is compensated for by shifting displacement of the scan area image caused by the relative angular displacement of plate 174 with respect to the imaging light path. It is also to be understood that the color wheel is phased with respect to the sampling intervals of the linear photosensor array such that during each sampling interval light from only one of the three different filter portions is impinged on the linear photosensor array. Thus data representative of first a blue component image, then a green component image, then a red component image of scan line 6 is produced during the three sampling intervals in which scan line 6 is impinged on photosensor 138. In order to prevent light which impinges on the linear photosensor 138 from passing through more than one filter portion, opaque portions 188, 190, 192, 194 are provided between the regions 182, 184, 186, and at the ends of plate 174.

It will also be appreciated from the above that as plate 174 rotates past the position illustrated in FIG. 6, the next plate 172 will initially assume the approximate position of plate 174 in FIG. 4, and will at that time cause a shift in the scan line which is registered with linear photosensor 138, i.e., scan line 7 will be placed in registration with linear photosensor array 138, replacing scan line 6. After plate 172 has completed its passage through the imaging light beam, plate 178 will enter into intersecting relationship with the imaging light beam to again cause a one scan line shift in the scan line which is registered with the photosensor. Plate 178 will have the imaging beam from the scan area incident on its radially outer surface as it rotates upwardly through the imaging light beam. However, the scan line shifting operation and color filtering operations which it performs will be identical to those described above when the imaging beam was incident on the radially inner surface of a filter plate.

In this manner each scan line on the document has its image maintained in registration with the linear photosensor array 138 for three consecutive sampling intervals during which a blue, green and red color component image of the scan line are generated.

In the embodiments of the invention illustrated in FIGS. 1–7, the color wheel is shown positioned on the object side of the imaging lens assembly; however, it is to be understood that the color wheel could alternatively be positioned on the image side of the lens assembly. FIGS. 8–13 illustrate another scanning apparatus 310 for generating a data signal representative of an object 312 which is scanned. Scanning apparatus 310, in general, comprises a linear photosensor 315 located at an image plane PP for generating a data signal representative of the duration and intensity of light impinged thereon during a photosensor operating interval. An imaging assembly 318 is provided for imaging scan line portions 320, 321, etc. of the object 312 onto the linear photosensor 315. An image beam 340 extends between a currently imaged one of the scan line portions 320, 321, etc. and the linear photosensor 315. A scanning displacement assembly 350 produces relatively constant rate displacement between the object 312 and at least one component of the scanner optical assembly, e.g. the imaging assembly 318 and photosensor 315, during a scanning cycle for causing the scan line portions 320, 321, etc. of the object 312 to be sequentially imaged on the linear photosensor means 315. An image registration holding assembly 316, FIG. 8 operably associated with the scanning displacement assembly 350 operates to hold an image, e.g. 332, FIGS. 11 and 12, from one scan line portion, e.g. 322, FIG. 10, of the object 312 in registration with the linear photosensor during a holding cycle. An integer number of photosensor operating intervals, for example three operating intervals, occurs during each holding cycle with an image, e.g. 332, from only a single scan line portion, e.g. 322, of the object being held in registration with the linear photosensor 315 during any photosensor operating interval. The scanning apparatus 310 thus "freezes" a scan line on the linear photosensor during any operating interval and eliminates the "averaging" of multiple scan line portions which occurs with conventional flatbed scanning devices.

Having thus described scanning apparatus 310 in general, the apparatus will now be described in further detail.

Figure 9:
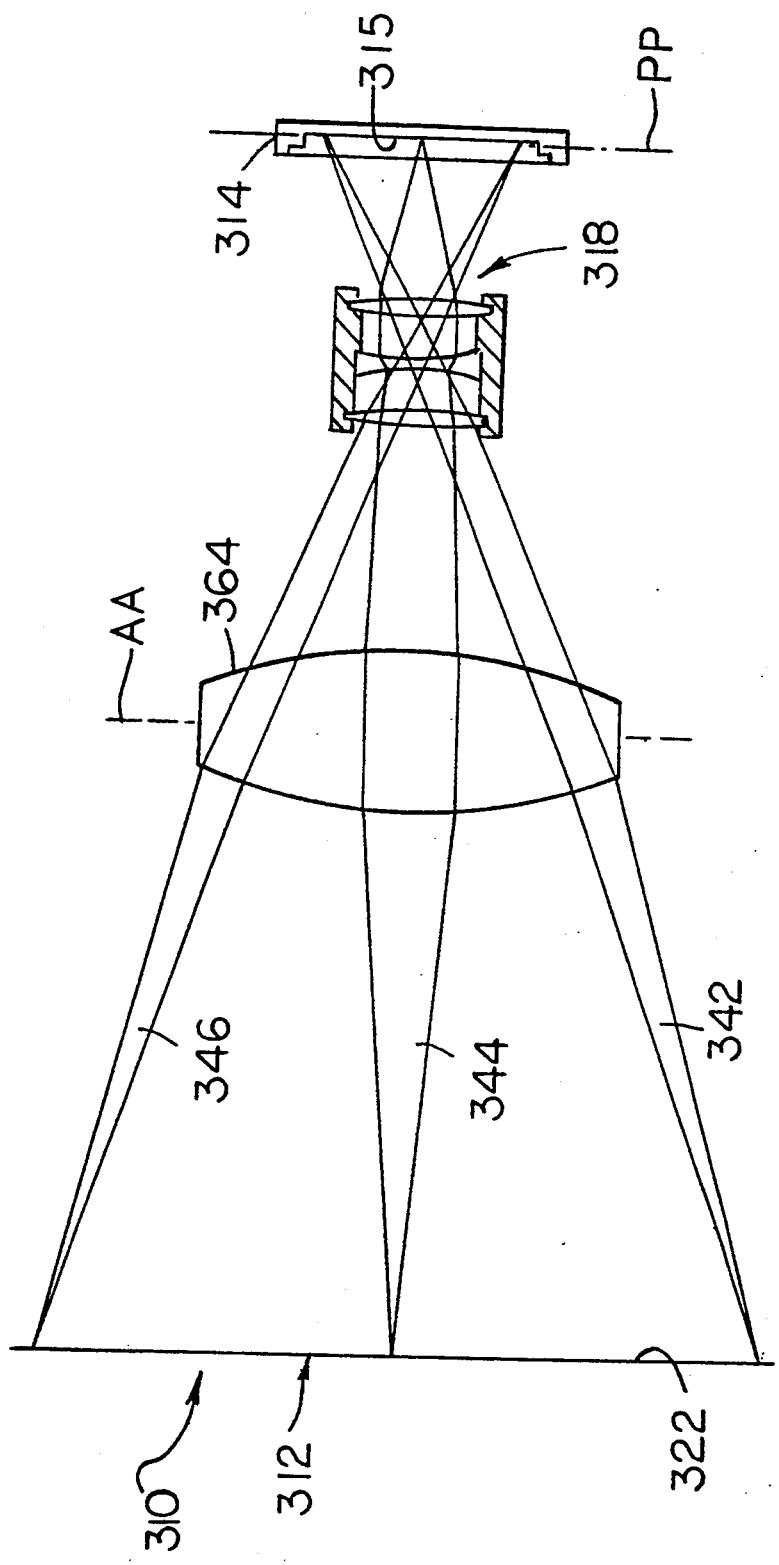
FIG. 9 is a schematic top plan view of the apparatus of FIG. 8.
Figure 10:
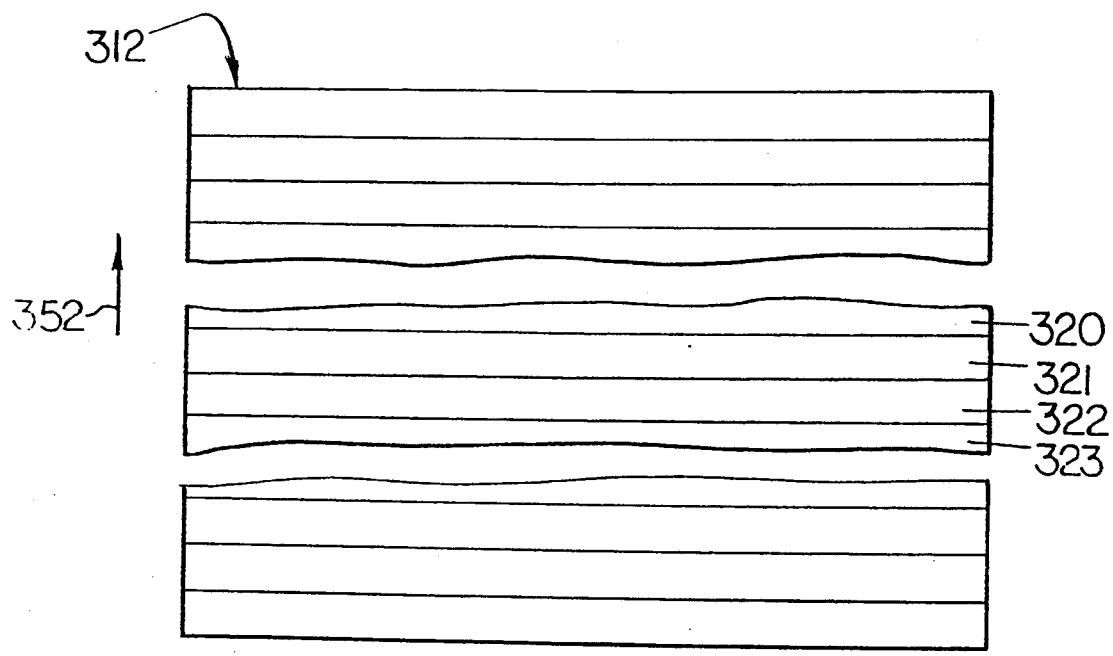
FIG. 10 is a plan view of an object scanned by the scanning apparatus of FIGS. 8 and 9.
Figure 11:
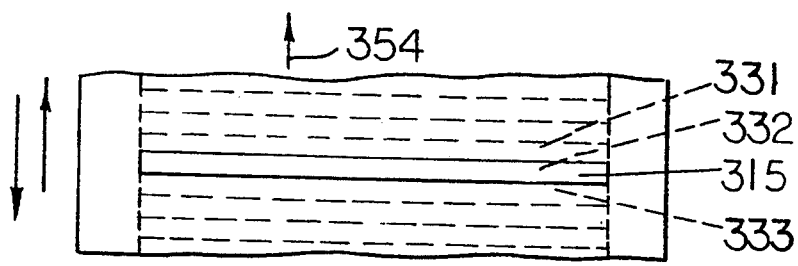
FIGS. 11 and 12 are elevation views of portions of the photosensor unit of FIGS. 8 and 9 showing an image of the scanned object of FIG. 10 projected thereon.
Figure 12:
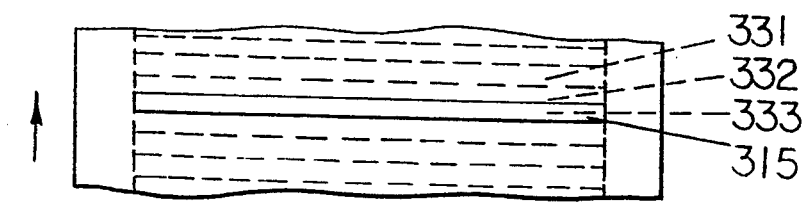

Scanning apparatus 310 is adapted for scanning an object 312 through use of a photosensor unit 314 having a single linear photosensor array 315 such as a conventional CCD array. The single line photosensor array 315 is located at the image plane PP of an imaging lens assembly 318 which may be a conventional flatbed scanner imaging lens assembly. The photosensor unit 314 is mounted on a photosensor reciprocation unit 316 which moves the photosensor unit in a first linear direction 317 and a second linear direction 319 opposite from the first direction 317. The photosensor reciprocation unit moves the photosensor unit between a first position $S_1$ and a second position $S_2$. The imaging lens assembly images scan line portions 320, 321, 322, 323 of object 312 such that corresponding imaged scan line portions 330, 331, 332, 333 are focused on image plane PP. An image beam 340 extends from the object 312 to the image plane PP. FIG. 9 illustrates image beam portions 342, 344, 346 associated with separate points on a scan line, e.g. scan line 322.

Figure 8:
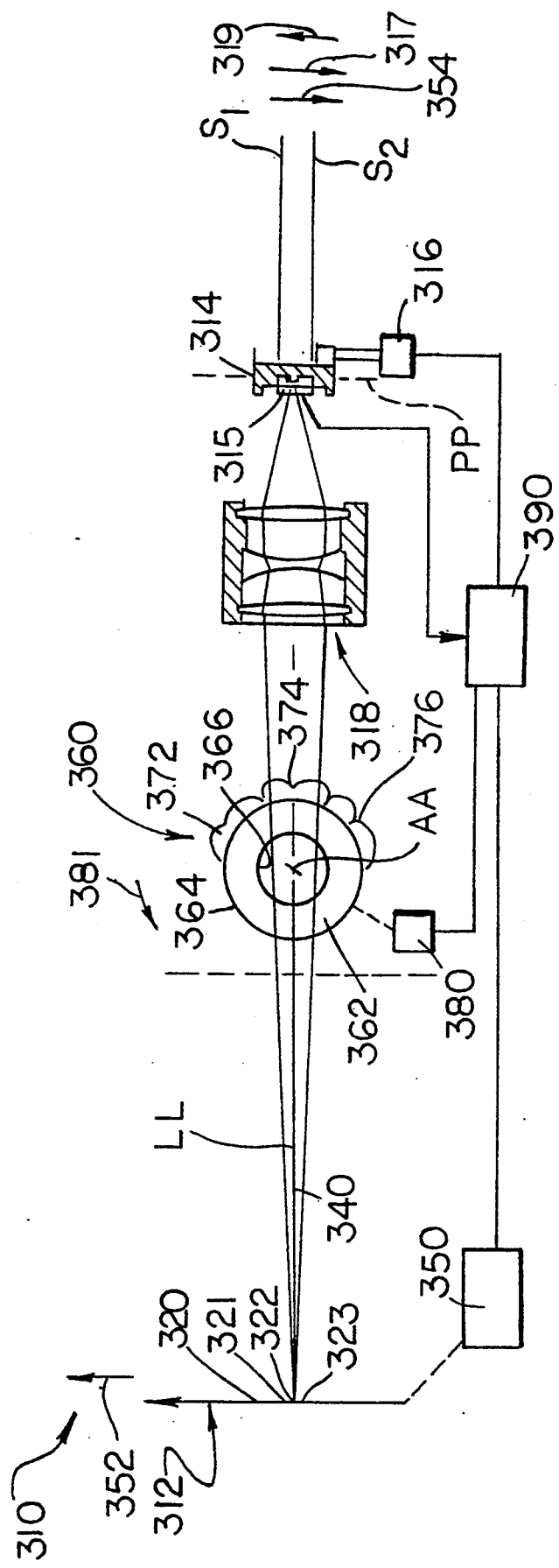
FIG. 8 is a schematic elevation view of a color scanning apparatus with a generally cigar-shaped color wheel and reciprocating photosensor unit.

A scanning displacement means 350, FIG. 8, causes relative displacement between the document (object 312) being imaged and the scanner optics such that scan line portions 320, 321, 322, 323, etc. are sequentially moved across the image plane. Various scanning displacement means are known in the art such as displacement devices which move the imaging assembly while the document remains stationary, devices which move the document relative to the scanner optics, devices which displace mirrors to produce relative movement of scan line portions of the document across an image plane, etc. The scanning displacement assembly 350 may comprise any such relative displacement device or other relative displacement devices. Most scanning displacement devices operate to produce a relatively constant speed of movement of a particular scanner component, and the scanning displacement device 350 of the presently described embodiment may also operate in this manner. For example, in a flatbed scanner which displaces the support plate upon which the document to be scanned is mounted, the support plate would be moved at a substantially constant velocity from the beginning to the end of a scanning pass. The scan direction on the object 312 being scanned is indicated by arrow 352. The corresponding scan direction on the image plane is indicated by arrow 354. It will be seen that the scan direction 354 on the image plane is the same direction as the first direction 317 of photosensor movement produced by reciprocation unit 316.

A color separating device 360 sequentially filters different spectral ranges of light from imaging beam 340. The color separating device 360 may comprise a generally cigar-shaped tubular member 362 having an outer surface 364 and an inner surface 366, and having a central longitudinal axis AA intersecting and extending perpendicular to the central longitudinal axis LL of image beam 340. One circumferential half of the outer surface 364 of the tubular member may be coated with filter material, such as for example dichroic filter material, allowing passage of different spectral ranges of light. In one preferred embodiment of the invention a red coating 372, a green coating 374, and a blue coating 376 are provided on adjacent, equal-sized, arcuate portions of outer surface 364. Each arcuate filter portion may be approximately sixty degrees or alternatively may be approximately forty degrees with opaque, i.e. black, coatings applied between the filter portions, having arcs of approximately 20 degrees to prevent overlap of different color images during photosensor operating intervals as discussed with reference to previously described embodiments of the invention. Alternatively, rather than opaque regions, transparent regions may also be provided to allow partial color mixing to occur during the generation of data signals. The transparent regions may be of the same size as the previously described opaque regions and in general such regions may be of a size from 0% to 50% of the arcuate size of each color region, but are preferably in a size range of 5% to 30% of each color region for optimal performance. The outer and inner surfaces 364, 366 of the tubular member may be shaped so as to provide a null lens, i.e. so as to provide no magnification or distortion to the image beam 340 which passes through it.

A tubular member drive motor 380 is operably connected to the tubular member to rotate the tubular member about axis AA in direction 381 at a predetermined speed based upon a signal from control unit 390 as further discussed below.

Figure 13:
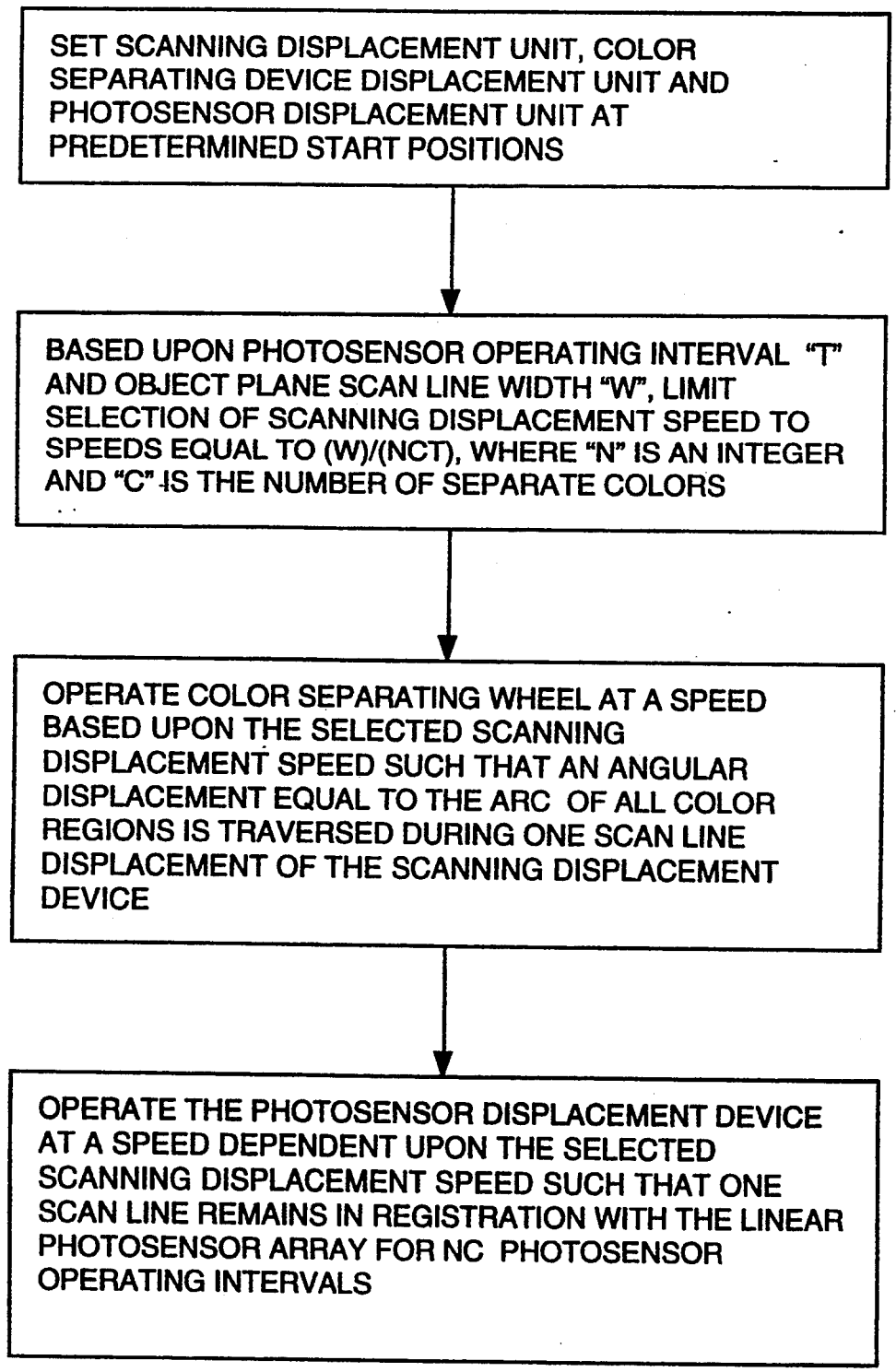
FIG. 13 is a flow chart representing the operation of the controller as shown in FIG. 8.

The operation of the controller 390 will now be discussed with reference to FIG. 13. The controller 390 initially sends control commands to scanning displacement actuator 350, tubular member drive motor 380, and photosensor reciprocation unit 316 to place each unit at an initial start position. For example, in a moveable plate type displacement unit, actuator 350 may move the plate to a position where the leading edge of a document to be scanned is in registration via imaging beam 340 with linear photosensor 315; motor 380 may position the tubular member at a location where the leading edge (in terms of direction of rotation) of the first arcuate filter portion 372 intersects imaging light beam 340 and reciprocation unit 316 may be actuated such that photo sensor unit 314 is positioned at location $S_1$.

Next, based upon the photo sensor operating interval "T" and the object plane scan line widths "W" the controller limits the scanning displacement speed which may be selected by an operator to a speed equal to (W) divided by (NCT), where "N" is an integer number and where "C" is the total number of different color regions on the color wheel. In the embodiment of FIGS. 8 and 9, "C" is three. Next, the controller operates the tubular member drive wheel 380 such that the tubular member is rotated at a speed dependent upon the selected scanning displacement speed such that an angular displacement equal to the arc of all of the color regions, including adjacent opaque regions, (approximately 180 degrees in the embodiment of FIG. 8) is traversed during one scan line displacement produced by scanning displacement motor 350.

The controller 390 also issues a command to the photosensor reciprocation device 316 to cause the photosensor unit 314 to be displaced at a speed dependent upon the selected scanning displacement speed such that one scan line, e.g. scan line 322, with corresponding scan line image 332, remains in registration with the linear photo sensor array 315 for NC photo sensor operating intervals. For example, three photo sensor operating intervals for the embodiment of FIG. 8 when integer number N is equal to one.

Thus, in the above described cycle of operation, initial scan line 322 is placed in registration with linear photo sensor array 315 when the photo sensor array is located at position $S_1$ and remains in registration with linear photo sensor array 315 as it is displaced from position $S_1$ to position $S_2$. During the movement of linear sensor array 315 from position $S_1$ to position $S_2$, tubular member 362 rotates approximately 180 degrees such that first a red image of scan line 322 is impinged on photo sensor 315, then a green image of scan line 322 is impinged on 315 and finally, a blue image of scan line 322 is impinged on linear photo sensor 315. The impingement of red, green and blue images 332 of scan line 322 onto linear photo sensor array 315 occur during different photosensor operating intervals. For example, when the scan speed is selected such that integer number N is 1, the red image is impinged during a first operating interval, the green image is impinged during a second operating interval immediately following the first interval, and the blue image is impinged during a third operating interval immediately following the second operating interval. At the end of one scan line displacement by motor 350 the controller actuates reciprocation unit 316 to immediately and rapidly return linear photo sensor 315 from position $S_2$ to position $S_1$ and the entire operation is repeated with the next scan line, e.g. scan line 323, having corresponding image 333 focused on linear photo sensor array 315 during the next NC number of operating intervals.

Due to chromatic aberration, imaging light beams from different color spectrums have slightly different focus distances. Thus, in the above described assembly in which first a red, then a green, then a blue imaging beam are imaged on plane PP, at least one of the color component images will be somewhat out of focus unless focus correction is provided. Focus correction may be provided in the above assembly by appropriate contouring of the portion of tubular member 362 in alignment with a subject arcuate color portion. For example, the green color component beam typically has a focus distance slightly less than the focus distance of the blue and red color component beams, and thus the portion of the tubular member in alignment with the green arcuate portion may be contoured on either the inner or outer, or both inner and outer surfaces 364, 366 in order to provide the appropriate focus correction. Color registration error associated with different color component image sizes may be corrected by the data signal manipulation technique described in U.S. Pat. application Ser. No. 08/088,017 filed Jul. 6, 1993 of Steinle et al. for METHOD AND APPARATUS FOR CORRECTING COLOR REGISTRATION ERROR which is hereby specifically incorporated by reference for all that it discloses.

In the above described embodiment, the tubular member is continuously rotated about axis AA in order to sequentially filter the imaging light beam to produce red, green and blue color component images at the image plane. However, the same result could be achieved by oscillating the tubular member about axis AA, i.e., the tubular member would be rotated at a normal speed during three photo sensor operating intervals associated with red, then green, then blue color component image production, and then at the end of the last operating interval, would be rotated quickly, e.g. in less than 5% of the duration of a photosensor operating interval, back to its original position, either moving in a direction opposite from the direction 381 in which it rotates during color component beam production or in the same direction. Such an oscillating assembly would be necessary if component beam differential focusing were implemented.

Figure 14:
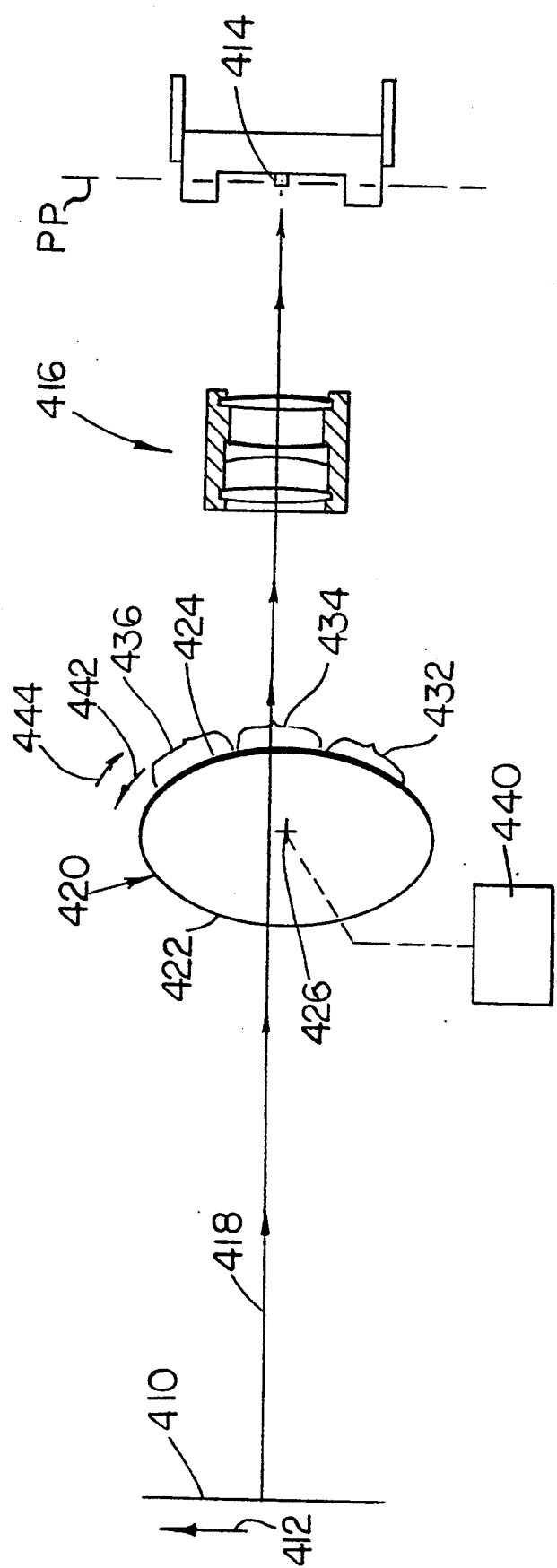
FIG. 14 is a schematic side elevation view of a color optical scanner having an oscillating member of generally elliptical cross-section, having an axis of rotation perpendicular to the longitudinal axis of an imaging light beam which it impinges.
Figure 15:
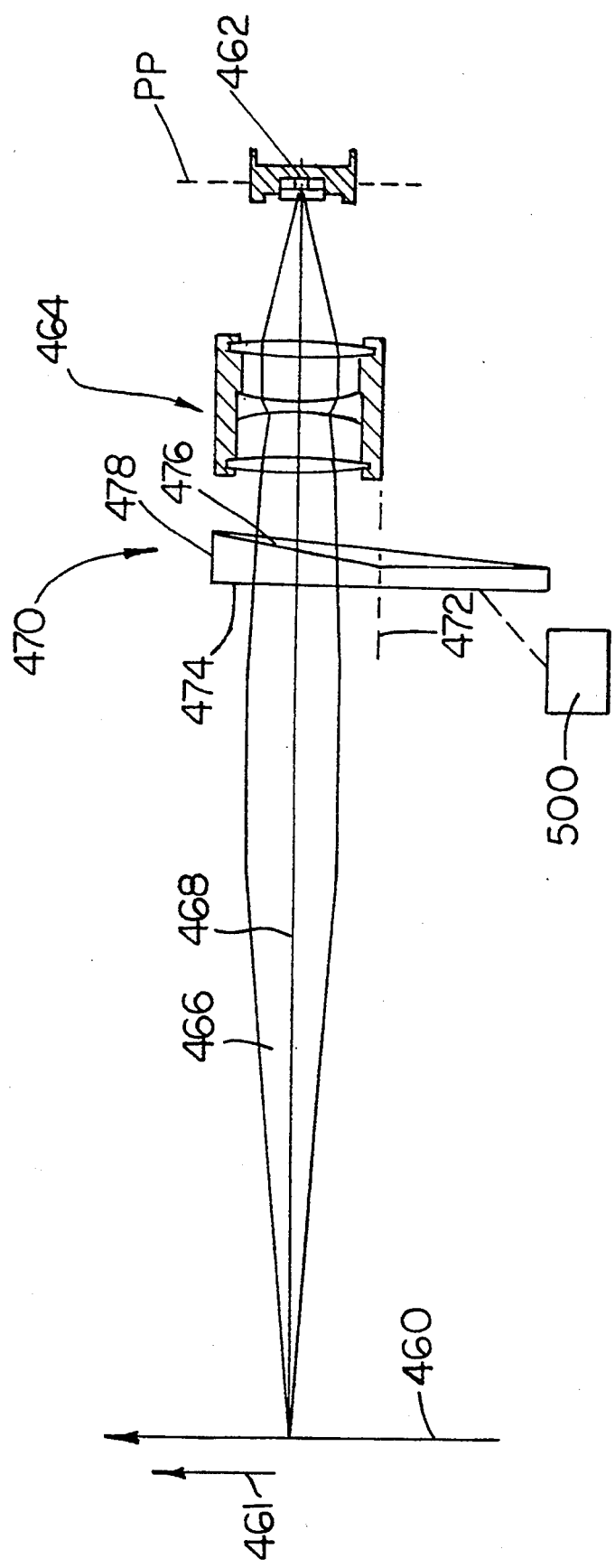
FIG. 15 is a schematic side elevation view of a color scanning apparatus having a disk with wedge-shaped cross-sections of varying angle and having an axis of rotation extending parallel to an imaging light beam which it intersects.

FIG. 14 illustrates another embodiment of the invention in which color registration between a scan line and a linear photo sensor is maintained through "beam steering". In this, as in previously described embodiments of the invention, a scanned object 410 is moved in a scan direction 412 relative to a linear photo sensor array 414 by a scanning displacement assembly which may be of a type described above. An imaging lens assembly 416 images the scan object 410 on linear photo sensor array 414 which is located at image plane PP. An imaging light beam having a central longitudinal axis 418 extends from the scan object 410 to the linear photo sensor array 414, as previously described. An elongate member 420 having a generally elliptical cross section as shown in FIG. 14 is positioned between the scan object 410 and lens assembly 416. Member 420 has a forward curved surface 422, and a rear curved surface 424, having biaxial symmetry about a central longitudinal rotation axis 426 which extends perpendicular to beam axis 418 and parallel to the longitudinal axis of linear photo sensor array 414. The rear surface 424 of member 420 is coated with a first filter coating 432 (which may allow only the passage of red light) extending across approximately a lower third thereof, a second filter coating 434 (which may allow passage of only green light) extending across approximately the middle third thereof, and a third filter coating 436 (which may allow only the passage of blue light) extending across approximately an upper third thereof. An oscillation motor 440 is provided which moves member 420 in a first oscillation direction 442, and a second oscillation direction 444.

In operation, at the beginning of an oscillation cycle, member 420 is positioned at an angular orientation such that the imaging light beam intersects a lowermost portion of the red-passing filter coating 432. The curvature of member 420 is such that the imaging light beam is refracted upwardly as it emerges from the rear surface 424. The member 420 is rotated in direction 444 at a rate proportional to the scan speed. The curvature of forward and rear surfaces 422, 424 is selected such that each scan line remains "frozen" on the linear photo sensor 414 as the member 420 is rotated through approximately 180 degrees. At the end of this 180 degree rotation, the imaging beam 418 intersects the upper portion of the blue-passing filter 436 and is refracted upwardly into registration with the linear photo sensor 414. As in the previously described example, the scan speed 412 and displacement rate and direction 444 are dependent upon the linear photo sensor operating interval, and are selected such that an integer number of photo sensor operating intervals, e.g. one, multiplied by the number of filter layers provided on member 420, e.g. three, occur during each oscillation of member 420. Thus, for example, the scan speed and member 420 rotation rate may be selected such that the portion of imaging light beam 418 which is imaged on the linear photo sensor 414, intersects each filter layer for one photo sensor operating interval in an oscillation cycle. At the end of the photo sensor operating interval during which the blue filter layer 436 is intersected, member 420 is rapidly rotated in direction 442 back to its initial start position. The rotation in direction 442 is sufficiently rapid such that the period of return movement is extremely small relative to a photo sensor operating interval, e.g. less than five percent. Thus, the relative amount of any "trash" data which is introduced during the next photo sensor operating interval is negligible. Of course, rather than providing for a return oscillating movement of member 420, motor 440 could be driven in a manner to rapidly rotate member 420 in the same direction 444 in which it is initially rotated, in order to return it to its start position, i.e., in this adaptation, member 420 would rotate in only one direction. As in previously described embodiments of the invention, relatively small width bands of opaque coatings or transparent regions may be provided between the red, green, and blue filter layers, to serve as transition layers at the beginnings and ends of photo sensor operating intervals.

As previously discussed, due to lens chromatic aberration, the focus distance of color component imaging beams varies slightly from beam to beam, and thus may result in slight blurring of the image of one or more of the beams. This problem may be overcome by shaping the front and rear surfaces of member 420 to provide differential focal length adjustment of one or more of the color component beams. For example, the surface coated by the green light-passing filter layer 434 may be shaped to slightly increase the focus distance of the green imaging beam to match the focus distance of the red and blue imaging beams. In such an embodiment, the color registration error problem associated with differences in magnification may be overcome by pixel data signal management, such as described in U.S. Pat. application Ser. No. 08/088,017 filed Jul. 6, 1993 of Steinle et al. for METHOD AND APPARATUS FOR CORRECTING COLOR REGISTRATION ERROR which is hereby specifically incorporated by reference for all that it discloses.

Another embodiment of the invention, in which "beam steering" is employed to "freeze" each scan line on a linear photo sensor during a series of photo sensor sampling intervals, is illustrated in FIGS. 15–18. In this embodiment, as in previously described embodiments, a scan object 460 is relatively displaced in a scan direction 461 with respect to a linear photo sensor array 462, located at an image plane PP. An imaging lens assembly 464 focuses an imaging light beam 466 having a central longitudinal axis 468 from the scan object onto the linear photo sensor array 462.

A generally disk shaped member 470 having a central longitudinal disk axis 472 is positioned between the scan object 461 and the imaging lens assembly 464 in intersecting relationship with the longitudinal axis 468 of the imaging light beam. A first planer face surface 474 of the disk extends perpendicular to the central longitudinal axis 472 of the disk, and perpendicular to axis 468 of the imaging light beam. A second generally spiral shaped face surface 476 of the disk also intersects the imaging light beam and causes the light beam to be deflected at an angle e (FIGS. 17 and 18) from its original direction. The outer periphery 478 of the disk member 470 varies in its longitudinal direction (parallel to axis 472) continuously around the circumference of the disk, except for a straight line discontinuity where the minimum thickness region and the maximum thickness region abut as indicated at 480 in FIG. 16. Face surface 476 slopes at a flat taper from its outer circumference 478 to center point 482 at all arcuate positions thereof.

Figure 16:
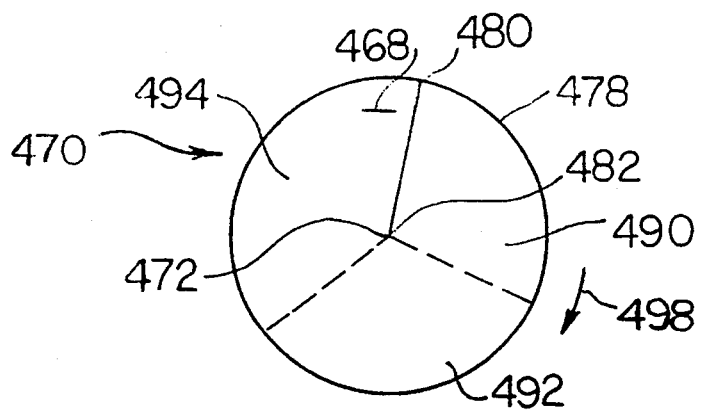
FIG. 16 is a rear elevation view of the disk portion of the scanning apparatus of FIG. 15.

As best indicated by FIG. 16, one of the face surfaces, in this example face surface 476, is provided with different filter coatings depending upon the color component beams which are to be sensed by the scanning device. In the embodiment of FIG. 16, a red light-passing filter region 490 occupies the first arcuate third of the face surface, extending clockwise from the discontinuity line 480; a green light-passing filter region 492 is located in the next arcuate third, and a blue light-passing filter region 496 is located in the last arcuate third. As previously described, opaque or clear arcuate regions may be provided between the red, green and blue arcuate regions to facilitate transition at the beginning and end of photo sensor sensing intervals.

Figure 17:
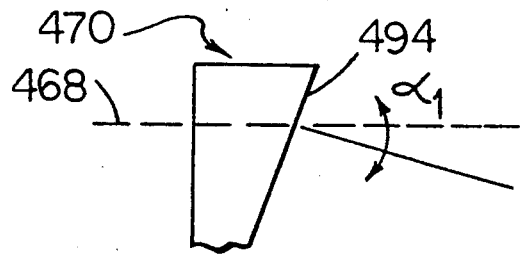
FIGS. 17 and 18 are detailed cross-sectional views of different portions of the disk of FIGS. 15 and 16 showing variations in light beam refraction as a result of differences in wedge angle.
Figure 18:
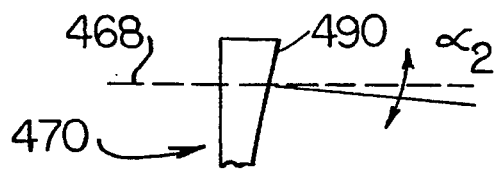

The differential steering, which is achieved by the varying wedge angle produced by the spiral shape of face surface 476 is illustrated in FIGS. 17 and 18. When the wedge angle is relatively greater, the amount of light beam deflection occurring as a result of refraction as indicated at $a_1$ is relatively greater than the angle $a_2$ which occurs with a wedge of smaller angle. Accordingly, during the 360 degree revolution of disk member 470, the beam is steered from a maximum deflection beginning at point 480, when the wedge angle is largest, to a minimum deflection, e.g. zero, for a zero wedge angle at the end of one revolution at transition point 480. Of course, a negative wedge angle could also be provided for steering the beam in the opposite direction from that achieved with a positive wedge angle to further increase the relative steering distance achieved in one full revolution of the disk member.

In operation, the disk member 470 is rotated in direction 498 about longitudinal axis 472, by the length of motor 500 at a rotation speed which is dependent upon scan speed and photosensor 462 operating intervals, as described above for the other embodiments, so as to freeze each successive scan line on the photosensor for NC photosensor operating intervals per disk 470 revolution. Surfaces 474 and 476 may also be contoured to provide differential focus adjustment for the component color beams.

Figure 19:
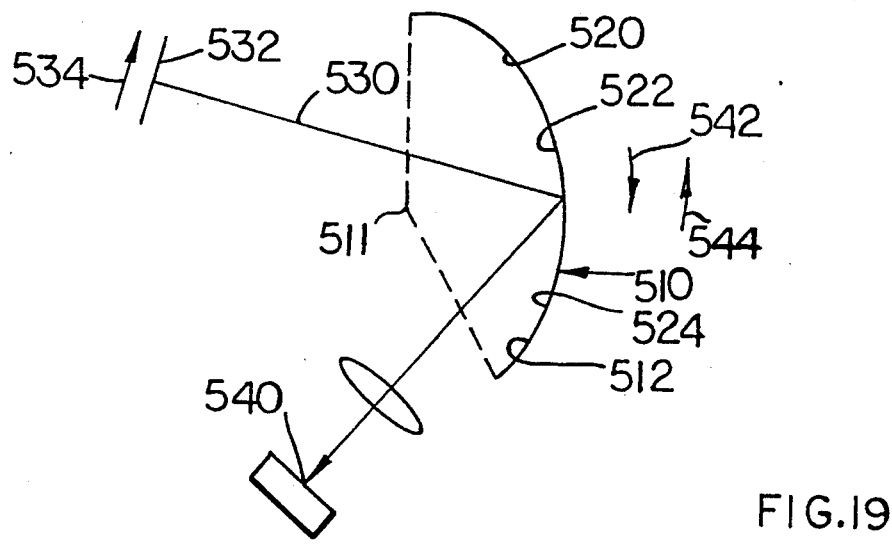
FIG. 19 is a schematic side elevation view of a color scanning apparatus having an oscillating mirror with an oscillation axis extending perpendicular to an imaging light beam which it reflects.

Reflective devices may be substituted for and used to perform the same functions as the light transmissive devices specifically described herein. However, in most instances, light transmissive devices are preferable to reflective devices because they occupy less space than reflective devices, and thus enable a more spatially compact optical system to be provided. For example, as shown in FIG. 19, an oscillating mirror 510, having an oscillation axis 511, and having an inner surface 512 with three filter coated regions 520, 522, 524 of varying radius of curvature could be used to differentially steer a light beam 530 from a scan object 532 moving in scan direction 534 to "freeze" succeeding scan lines on a linear photo sensor 540. The mirror oscillates in direction 542, 544 and thus, operates in generally the same manner as member 420 described above. Similarly, differential mirror curvature could be used to adjust the focus of different color component imaging beams.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What it claimed is:

1. A scanning apparatus for generating a data signal representative of an object which is scanned comprising:

a linear photosensor means located at an image plane for generating a data signal representative of the duration and intensity of light impinged thereon during a photosensor operating interval;

imaging means for imaging scan line portions of said object onto said linear photosensor means, an image beam extending between a currently imaged one of said scan line portions of said object and said linear photosensor means;

scanning displacement means for producing relatively constant rate linear displacement between said object and said imaging means during a scanning cycle for causing said scan line portions of said object to be sequentially imaged on said linear photosensor means;

image registration holding means operably associated with said scanning displacement means for holding an image from a different scan line portion of said object in registration with said photosensor means during a holding cycle.

2. The invention of claim 1, further comprising: an integer number of photosensor operating intervals occurring during each said holding cycle, an image from only a single scan line portion of said object being held in registration with said photosensor means during any operating interval.

3. The invention of claim 2, wherein said image registration holding means holds images from each succeeding scan line portion of said object in registration with said photosensor means during each succeeding holding cycle.

4. The invention of claim 1, wherein said scanning apparatus comprises a color scanning apparatus, a spectral range of light in said image beam changing in accordance with a preset repeating sequence, the image of each scan line portion being held in registration with said photosensor means for a predetermined number of photosensor operating intervals during each holding cycle, said predetermined number of photosensor operating intervals being equal to the number of spectral ranges in said preset repeating sequence multiplied by an integer number.

5. The invention of claim 1, wherein said image registration holding means comprises an oscillating means intersecting said image beam.

6. The invention of claim 5, wherein said oscillating means comprising an oscillating lens.

7. The invention of claim 6, wherein said oscillating lens comprises a plurality of different light filter portions which intersect said beam according to a predetermined sequence during each oscillation.

8. The invention of claim 5, wherein said oscillating means comprises an oscillating reflecting surface.

9. The invention of claim 8, wherein said oscillating reflecting surface comprises a plurality of different light filter portions which intersect said beam according to a predetermined sequence during each oscillation.

10. The invention of claim 1, wherein said image registration holding means comprises a rotating means intersecting said image beam.

11. The invention of claim 10, wherein said rotating means comprising a rotating lens.

12. The invention of claim 10, wherein said rotating means comprises a plurality of different light filter portions which intersect said beam according to a predetermined sequence during each rotation.

13. The invention of claim 10, wherein said rotating means comprises a generally cylindrically shaped member having an axis of rotation extending parallel to said beam at the point of beam intersection.

14. The invention of claim 13, wherein said generally cylindrically shaped member has a generally spiral shaped end face which intersects said image beam.

15. The invention of claim 14, wherein said spiral shaped end face is divided arcuately into a plurality of different light filter portions which intersect said beam according to a predetermined sequence during each rotation.

16. The invention of claim 4, wherein said image registration holding means comprises a plurality of color filters incorporated therein.

17. The invention of claim 16, wherein said image registration holding means comprises differential focusing means incorporated therein for differentially focusing said image beam on said photosensor means in accordance with the spectral range of light which is currently impinged on said photosensor means.

18. The invention of claim 4, wherein said image registration holding means comprises differential focusing means incorporated therein for differentially focusing said image beam on said photosensor means in accordance with the spectral range of the light which is currently impinged on said photosensor means.

19. The invention of claim 1, wherein said image registration holding means comprises oscillating means operatively associated with said linear photosensor means for oscillating said linear photosensor means.

20. A scanning apparatus for generating a data signal representative of an object which is scanned comprising:
   a linear photosensor means located at an image plane for generating a data signal representative of the intensity of light impinged thereon;
   imaging means for imaging scan line portions of said object onto said linear photosensor means, an image beam extending between a currently imaged one of said scan line portions of said object and said linear photosensor means;
   scanning displacement means for producing relatively constant rate linear displacement between said object and said imaging means during a scanning cycle for causing said scan line portions of said object to be sequentially imaged on said linear photosensor means;
   image filter means operably associated with said scanning displacement means and intersecting said image beam for sequentially filtering different spectral bands of light in said image beam in a plurality of filtering intervals occurring during a filtering cycle, multiple filtering cycles occurring during each scanning cycle;
   image focus means operably associated with said image filter means for differentially accurately focusing said image beam during each of said filter intervals for adjusting for different focal lengths associated with different spectral ranges of light whereby said image beam is accurately focused on said linear photosensor means during each of said filter intervals.

21. A scanning apparatus for generating a data signal representative of an object which is scanned comprising:
   a linear photosensor means located at an image plane for generating a data signal representative of the intensity of light impinged thereon;
   imaging means for imaging scan line portions of said object onto said linear photosensor means, an image beam extending between a currently imaged one of said scan line portions of said object and said linear photosensor means, said linear photosensor means having a sampling interval;
   image filter means operably associated with said imaging means and intersecting said image beam for sequentially filtering different spectral bands of light in said image beam in a plurality of filtering intervals, one filtering interval occurring during an integer number of photosensor means sampling intervals.

22. A method for generating a data signal representative of an object which is scanned comprising the steps of:

imaging scan line portions of said object onto a linear photosensor with an imaging assembly such that an image beam extends between a currently imaged one of said scan line portions of said object and said linear photosensor;

producing relatively constant rate linear displacement between said object and said imaging assembly during a scanning cycle such that scan line portions of said object are sequentially imaged on said linear photosensor;

holding images from different scan line portions of said object in registration with said photosensor means during repeating holding cycles;

generating at least one data sample from said linear photosensor per holding cycle.

* * * * *